(12) United States Patent
Xu

(10) Patent No.: US 7,465,934 B2
(45) Date of Patent: Dec. 16, 2008

(54) PIXEL ARRAY OUTPUT ROUTING STRUCTURE FOR MULTI-CHANNEL CMOS IMAGER SENSORS

(75) Inventor: Weize Xu, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 112 days.

(21) Appl. No.: 11/240,746

(22) Filed: Sep. 30, 2005

(65) Prior Publication Data

US 2007/0075255 A1    Apr. 5, 2007

(51) Int. Cl.
*G01T 1/24* (2006.01)
*H01L 27/00* (2006.01)
*H01L 31/062* (2006.01)

(52) U.S. Cl. ............... 250/370.14; 250/208.1; 257/291

(58) Field of Classification Search ......... 250/371, 250/208.1, 370.14; 257/291; 348/E3.022, 348/E9.01
See application file for complete search history.

(56) References Cited

U.S. PATENT DOCUMENTS

| | | | | |
|---|---|---|---|---|
| 6,466,265 B1* | 10/2002 | Lee et al. | ........... | 348/308 |
| 6,606,122 B1* | 8/2003 | Shaw et al. | ........... | 348/302 |
| 7,068,319 B2* | 6/2006 | Barna et al. | ........... | 348/372 |
| 2002/0101528 A1* | 8/2002 | Lee et al. | ........... | 348/304 |
| 2003/0067547 A1* | 4/2003 | Morris et al. | ........... | 348/273 |
| 2005/0145777 A1 | 7/2005 | Barna et al. | | |

FOREIGN PATENT DOCUMENTS

| | | | |
|---|---|---|---|
| EP | 0 757 497 A2 | 2/1997 | |
| EP | 0 967 795 A2 | 12/1999 | |
| EP | 1 349 399 A2 | 10/2003 | |

* cited by examiner

*Primary Examiner*—David P Porta
*Assistant Examiner*—Faye Boosalis
(74) *Attorney, Agent, or Firm*—Peyton C. Watkins

(57) ABSTRACT

A CMOS image sensor includes a plurality of pixels arranged in an array; a plurality of sample and hold arrays; and a routing matrix which routes a signal from each pixel to one of the sample and hold arrays in a predetermined order.

8 Claims, 4 Drawing Sheets

PIXEL ARRAY OUTPUT ROUTING STRUCTURE FOR MULTI-CHANNEL CMOS IMAGER SENSORS

FIELD OF THE INVENTION

The invention relates generally to the field of CMOS image sensors having multiple sample and hold processing channels and, more particularly, to such CMOS image sensors having a routing matrix that routes signals from the pixel array to each sample and hold processing channel in which each channel includes only one color.

BACKGROUND OF THE INVENTION

As the image size and speed of CMOS image sensors continue to increase, a multi-channel output architecture is being used. However, with the multi-channel output, the video signals must be put back into their proper order. This task is becoming more and more difficult and is causing a noise problem in the final video signal string.

Although the prior art is satisfactory, they include the above-described drawbacks. Consequently, a need exists for a CMOS image sensor having multi-channel output in which re-organizing the signals is eliminated.

SUMMARY OF THE INVENTION

The present invention is directed to overcoming one or more of the problems set forth above. Briefly summarized, according to one aspect of the present invention, the invention resides in a CMOS image sensor having a plurality of pixels arranged in an array; a plurality of sample and hold arrays; and a routing matrix which routes a signal from each pixel to one of the sample and hold arrays in a predetermined order.

These and other aspects, objects, features and advantages of the present invention will be more clearly understood and appreciated from a review of the following detailed description of the preferred embodiments and appended claims, and by reference to the accompanying drawings.

Advantageous Effect Of The Invention

The present invention has the following advantage of eliminating signal reorganization at readout, increasing operational speed by reducing the load at the sample and hold circuit output, and increasing effective usability of pixel arrays having a large physical surface area.

DETAILED DESCRIPTION OF THE INVENTION

Figure 1:
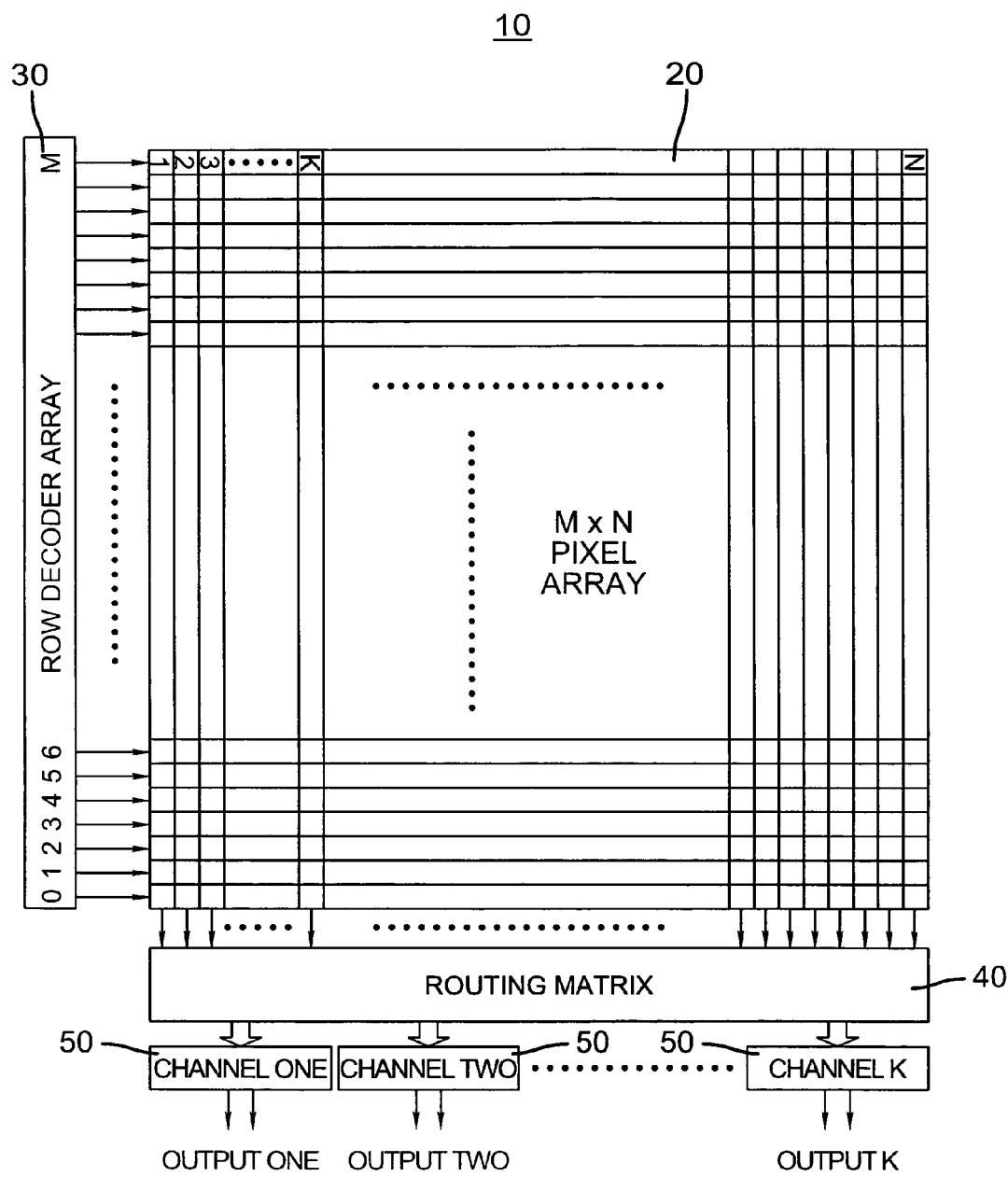
FIG. 1 is a top view of the CMOS image sensor of the present invention.

Referring to FIG. 1, there is shown a top view of a CMOS image sensor 10 of the present invention. The sensor 10 includes a two-dimensional array of pixels 20 arranged in rows and columns, a color filter array (CFA) (not shown) is positioned spanning over the pixels so that each pixel receives a particular color. In the preferred embodiment, the CFA is a Bayer color filter, which is well known in the art. A row decoder 30 is electrically connected to the array of pixels 20 and functions to selectively read out predetermined rows of pixels to a routing matrix 40. Preferably, the rows are routed to the routing matrix one row at a time. The routing matrix 40 will then route the signals from the pixel array 20 to one of a plurality of sample and hold arrays 50. It is further noted that pixels are routed to the sample and hold array 50 so that only one color is routed to any one particular sample and hold array 50. The number of sample and hold arrays 50 can vary to four or more depending on the desired speed. In the low speed arrangement shown in FIG. 3, there are four sample and hold arrays 50 and each array receives only one color. To double the speed, there would be 8 sample and hold arrays 50, and to triple the speed, there will be 12 arrays 50. For clarity, it is noted that in each arrangement, each channel will receive only one color as will be described in detail hereinbelow. From the sample and hold array 50, the signals are routed to further processing circuits (not shown) as is well know in the art for producing an electronic representation of an image.

Figure 2:
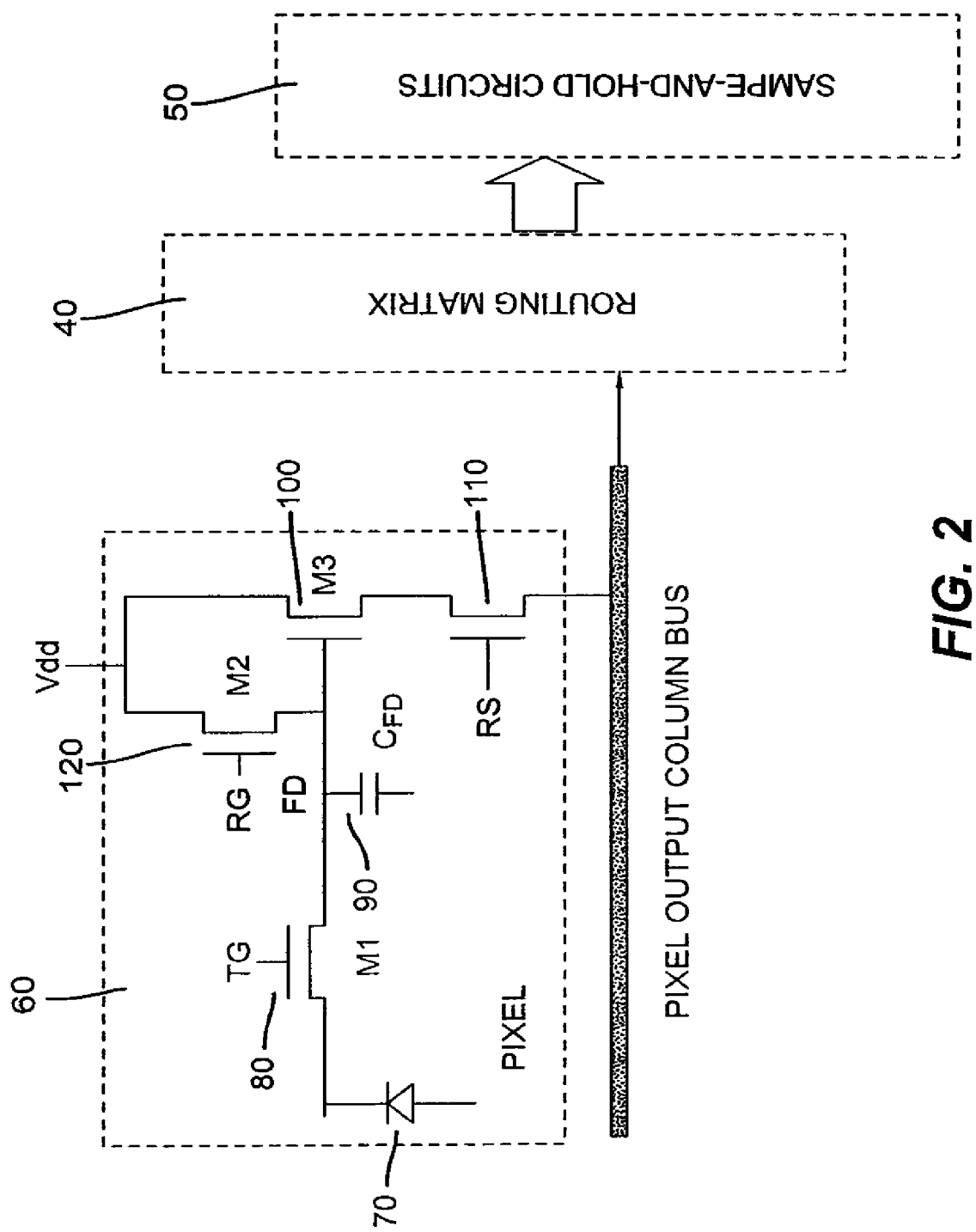
FIG. 2 is a schematic diagram of a typical CMOS active pixel of the present invention.

Referring to FIG. 2, there is shown a schematic diagram of a typical pixel 60 of the CMOS image sensor 10. The pixel 60 includes a photodiode 70 that receives incident light that is converted into a charge. A transfer gate (TG) 80 transfers the charge to a floating diffusion 90 which will convert the charge into a voltage. The voltage is sent to an amplifier transistor 100 for buffering the signal amplitude. In the preferred embodiment, the gain of the amplifier 100 is unity, or one, although other gain factors may be used depending on the desired design.

The row select transistor 110 receives a signal from the row decoder array 30 (see FIG. 1) for enabling the particular row of pixels to pass to the routing matrix 40. A reset gate transistor 120 functions to reset and clear the floating diffusion 90 of any residual charge before passing another image signal to the floating diffusion 90.

Figure 3:
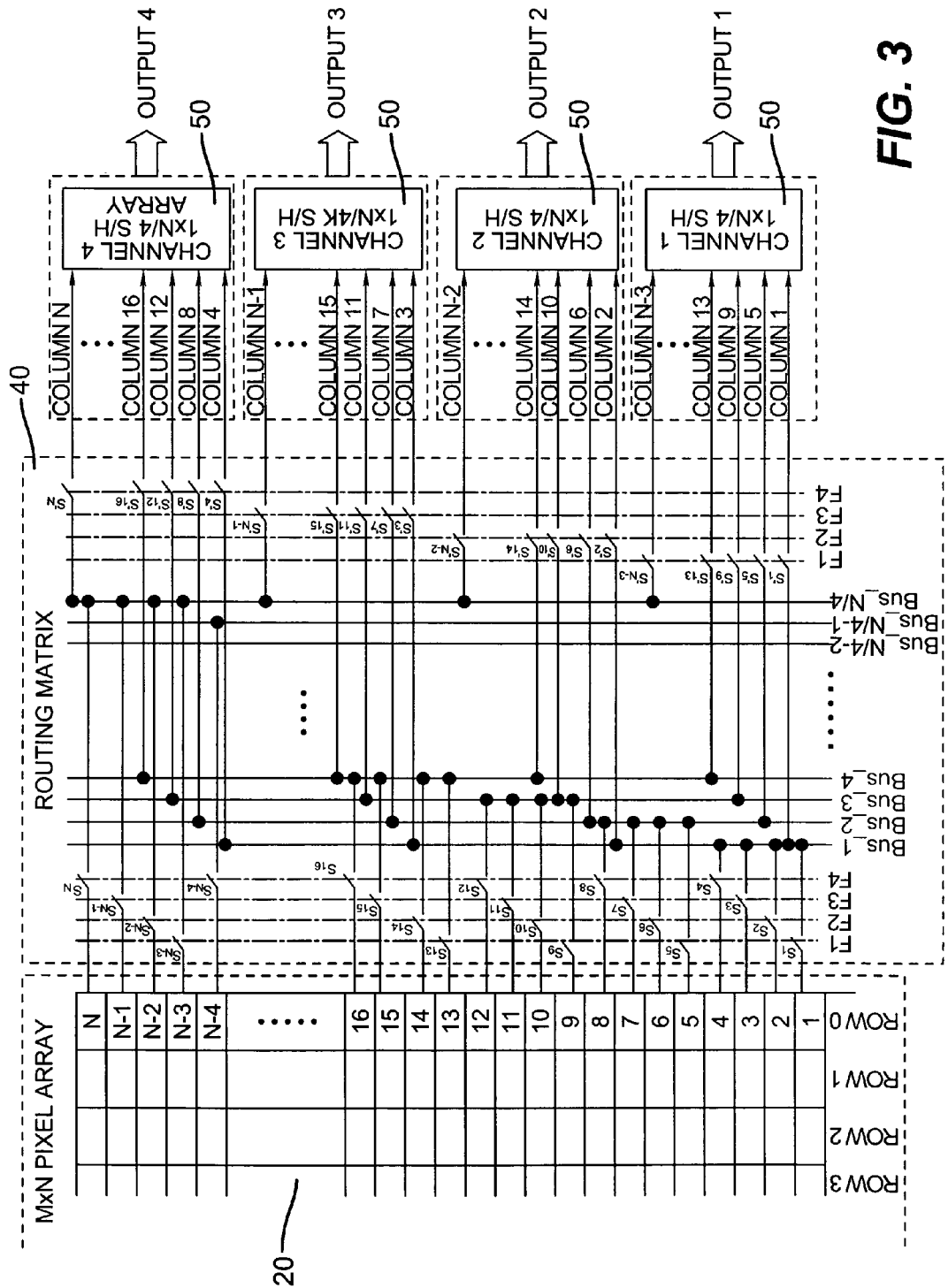
FIG. 3 is a diagram illustrating routing from the pixels to four sample and hold arrays.

Referring to FIG. 3, there is shown a schematic diagram of the connections between the array of pixels 20 to the routing matrix 40 and then to a sample and hold array 50. FIG. 3 depicts only four sample and hold arrays, although as stated hereinabove, to increase the speed the number of sample and hold arrays may be increased. In a general overview, each of the four colors is routed to a particular sample and hold array sequentially in time in a predetermined order. For example, color one is readout out first by enabling one of four sets of switches. The number of switches in each set is determined by N/4 where N is the number of pixels in each row. In transferring color one, the first set of switches including switches S1, S5, S9 and S13 and etc. are closed (all of the switches are not shown for drawing clarity). In this embodiment, three switches are skipped so that very $4^{th}$ switch is closed. A corresponding second set of switches are connected to the first set of switches, and in transferring color one, this set of switches are also substantially simultaneously closed (S'1, S'5, S'9 and S'13 and etc.) for transferring color one that particular sample and hold circuit 50. The number of switches in the set second set is also N/4 where N is the total number of pixels in a row. After completion of the transfer to the sample and hold circuit 50, these two sets of switches are opened (S1, S5, S9, S13, S'1, S'5, S'9, S'13 and etc.).

The second color is then transferred to a sample and hold array 50 by repeating the above sequence with its corresponding first and second set of switches (S2, S6, S10 and S14 and S'2, S'6, S'10, S'14). The process is synchronized so that the first color is transferred before the second color is transferred. Likewise, color three (using switches S3, S7, S11, S15 and etc. S'3, S'7, S'11, S'15) and color four (using switches S4, S8, S12, S16 and etc. S'4, S'8, S'12, S'16 and etc.) are also repeated in this synchronized manner for transferring their particular colors. It is noted that for a Bayer pattern the color in sample and hold channel 1 (50) is green 1; sample and hold channel 2 (50) contains green 2; sample and hold channel 3 (50) contains red; and sample and hold channel 4 (50) contains blue. It is noted that, for four channels, the color information from the sample and hold channels 50 are output substantially simultaneously so that all the color information (four color channels) for each pixel is received by the subsequent attached off-chip signal processing circuitry at substantially the same time. It is noted that, if there are 8 channels, two sequential color information signals are sent out on each clock cycle to the off-chip processing circuitry. Those skilled in the art will recognize that, as the number of channels is increased, the number of color information signals is accordingly increased as described hereinabove.

Figure 4:
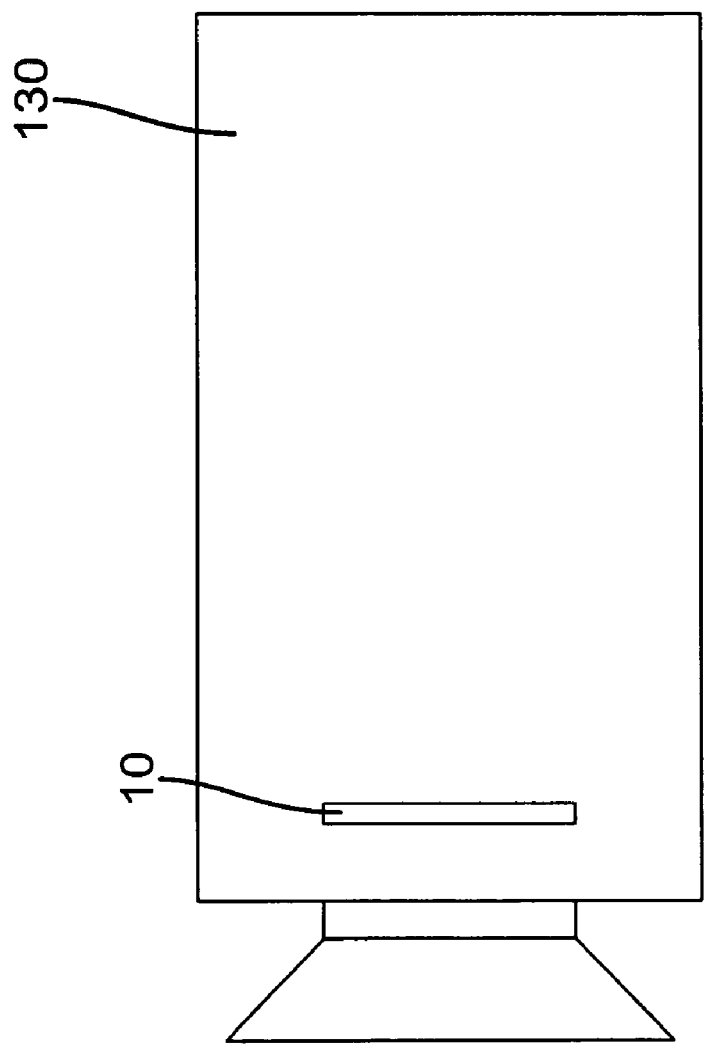
FIG. 4 is a perspective view of a digital camera containing the image sensor of the present invention for illustrating a typical commercial embodiment of the present invention.

Referring to FIG. 4, there is shown a digital camera 130 containing the image sensor 10 of the present invention for illustrating a typical commercial embodiment of the present invention with which the ordinary consumer is acquainted.

The invention has been described with reference to a preferred embodiment. However, it will be appreciated that variations and modifications can be effected by a person of ordinary skill in the art without departing from the scope of the invention.

PARTS LIST

10 CMOS image sensor
20 pixel arrays
30 row decoder
40 routing matrix
50 sample and hold arrays
60 typical pixel
70 photodiode
80 transfer gate
90 floating diffusion
100 pixel amplifier transistor
110 row select transistor
120 reset gate transistor
130 digital camera

The invention claimed is:

1. A CMOS image sensor comprising:
   (a) a plurality of pixels arranged in an array;
   (b) a plurality of sample and hold arrays; and
   (c) a routing matrix which receives signals from the array and routes the signals to the plurality of sample and hold arrays, wherein the routing matrix electronically divides the plurality of pixels in the array into groups and routes a signal from one or more pixels in each group to respective sample and hold arrays sequentially in time in a predetermined order, and wherein each signal in a group is routed to a different sample and hold array such that the signals received by each sample and hold circuit contain the same color.

2. The CMOS sensor as in claim 1, wherein the pixels are electronically connected into groups by the routing matrix and the routing matrix sends signals to the plurality of sample and hold circuits in a repeating pattern or substantially repeating pattern.

3. The CMOS sensor as in claim 2, wherein the repeating pattern is synchronized in time so that the particular signals are sent out from the routing matrix at substantially the same time.

4. The CMOS sensor as in claim 1, wherein the signals in each group are routed respectively through a set of switches in the routing matrix which are substantially synchronized in time.

5. An digital camera comprising:
   a CMOS image sensor comprising:
   (a) a plurality of pixels arranged in an array;
   (b) a plurality of sample and hold arrays; and
   (c) a routing matrix which receives signals from the array and routes the signals to the plurality of sample and hold arrays, wherein the routing matrix electronically divides the plurality of pixels in the array into groups and routes a signal from one or more pixels in each group to respective sample and hold arrays sequentially in time in a predetermined order, and wherein each signal in a group is routed to a different sample and hold array such that the signals received by each sample and hold circuit contain the same color.

6. The digital camera as in claim 5, wherein the pixels are electronically connected into groups by the routing matrix and the routing matrix sends signals to the plurality of sample and hold circuits in a repeating pattern or substantially repeating pattern.

7. The digital camera as in claim 6, wherein the repeating pattern is synchronized in time so that the particular signals are sent out from the routing matrix at substantially the same time.

8. The digital camera as in claim 5, wherein the signals in each group are routed respectively through a set of switches in the routing matrix which are substantially synchronized in time.

* * * * *